United States Patent
Healey

(10) Patent No.: US 6,735,739 B1
(45) Date of Patent: May 11, 2004

(54) TEXT IN ANCHOR TAG OF HYPERLINK ADJUSTABLE ACCORDING TO CONTEXT

(75) Inventor: Martin James Ronan Healey, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 09/015,713

(22) Filed: Jan. 29, 1998

(30) Foreign Application Priority Data

Aug. 13, 1997 (GB) ................................. 9717068

(51) Int. Cl.$^7$ ................................. G06F 7/00
(52) U.S. Cl. ................................. 715/513
(58) Field of Search ................ 345/351; 707/501, 707/513, 509

(56) References Cited

U.S. PATENT DOCUMENTS

| | | | |
|---|---|---|---|
| 5,546,529 A | | 8/1996 | Bowers et al. ............ 345/348 |
| 5,557,722 A | * | 9/1996 | DeRose et al. ........... 707/513 |
| 5,752,244 A | * | 5/1998 | Rose et al. ............... 707/5 |
| 5,758,186 A | * | 5/1998 | Hamilton et al. .......... 710/11 |
| 5,933,841 A | * | 8/1999 | Schumacher et al. ....... 707/501 |
| 5,968,125 A | * | 10/1999 | Garrick et al. ........... 709/224 |
| 5,978,798 A | * | 11/1999 | Poznanski et al. ......... 707/4 |
| 5,978,816 A | * | 11/1999 | Sakaguchi et al. ......... 707/501 |
| 5,978,818 A | * | 11/1999 | Lin ...................... 707/501 |
| 6,023,715 A | * | 2/2000 | Burkes et al. ............ 707/14 |

FOREIGN PATENT DOCUMENTS

| | | |
|---|---|---|
| EP | 0679999 | 11/1995 |
| WO | WO 96/06401 | 2/1996 |

OTHER PUBLICATIONS

"Microsoft Press Computer Dictionary, 3rd edition", Microsoft Press, 1997, p. 247.*

Denise Partlow "Implementation of a thesaurus in an electronic photograph imaging system", SPIE vol. 2606, pp 179–188.

* cited by examiner

Primary Examiner—Stephen S. Hong
Assistant Examiner—C B Paula
(74) Attorney, Agent, or Firm—A. Bruce Clay

(57) ABSTRACT

In a computer system, a method of forming a hyperlinked index of computer-readable pages of information, having steps of: accessing a table of stored table entries, each table entry having a long-name field for storing a long name of a first item, a short-name field for storing a short name of the first item and a related-items field for storing a name identifying a second item related to the first item; and for each accessed table entry, forming a main portion of an index entry having an anchor tag displaying the text appearing in said long-name field, and forming an associated portion of the index entry having an anchor tag displaying the text appearing in the short-name field of the table entry of the second item referred to in the related-items field.

9 Claims, 2 Drawing Sheets

```
                                                                  ┌─ 21
   ───────────────────────────────────────────────────

211 ─── long          :    bicycle

212 ─── short         :    bike

213 ─── syn1          :    cycle

214 ─── URL           :    www.Bobs.com/bike

215 ─── related items :    tube, water bottle
```

TEXT IN ANCHOR TAG OF HYPERLINK ADJUSTABLE ACCORDING TO CONTEXT

FIELD OF THE INVENTION

This invention relates to data processing and more specifically to presenting data on one or more computers connected via a computer network such as the Internet.

BACKGROUND OF THE INVENTION

In the past few years there has been an explosive growth in the use of the globally-linked network of computers known as the Internet, and in particular of the WorldWide Web (WWW), which is one of the facilities provided on top of the Internet. The WWW comprises many pages or files of information, distributed across many different server computer systems. Information stored on such pages can be, for example, details of a company's organization, contact data, product data and company news. This information can be presented to the user's computer system ("client computer system") using a combination of text, graphics, audio data and video data. Each page is identified by a Universal Resource Locator (URL). The URL denotes both the server machine, and the particular file or page on that machine. There may be many pages or URLs resident on a single server.

In order to use the WWW, a client computer system runs a piece of software known as a graphical Web browser, such as WebExplorer (provided as part of the OS/2 operating system from IBM Corporation), or the Navigator program available from Netscape Communications Corporation. "WebExplorer", "OS/2" and "IBM" are trademarks of the International Business Machines Corporation, while "Navigator" and "Netscape" are trademarks of the Netscape Communications Corporation. The client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is performed in accordance with the hypertext transport protocol ("HTTP")). This page is then displayed to the user on the client screen. The client may also cause the server to launch an application, for example to search for WWW pages relating to particular topics.

Most WWW pages are formatted in accordance with a language known as HTML (hypertext mark-up language). A data file written in this language contains the data to be displayed via the client's graphical browser as well as formatting commands which tell the browser how to display the data. Thus a typical Web page includes text together with embedded formatting commands, referred to as tags, which can be used to control the font size, the font style (for example, whether italic or bold), how to lay-out the text, and so on. A Web browser "parses" the HTML script in order to display the text in accordance with the specified format. HTML tags are also used to indicate how graphics, audio and video are manifested to the user via the client's browser.

Most Web pages also contain one or more references to other Web pages, which need not be on the same server as the original page. Such references may generally be activated by the user selecting particular locations on the screen, typically by clicking a mouse control button. These references or locations are known as hyperlinks, and are typically flagged by the browser in a particular manner (for example, any text associated with a hyperlink may be in a different colour). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

A common use of a Web page is to provide details concerning a company's products for sales purposes. In such Web pages, it has been found useful to provide an index Web page where users can search through a lengthy alphabetical list in order to find a hypertext link to another Web page that will provide a list of brands and model numbers of each item appearing in the index. For example, a sporting goods vendor may provide an index listing the word "bicycle" as an element in the index. A user could then click on the hypertext link having the textual anchor tag "bicycle" in the index and this action would trigger the user's Web browser to display a Web page listing various brands and models of bicycles which the vendor has for sale.

In order to make the search task easier for the user, the index also generally contains, under a single entry (e.g., "bicycle") an indented list of associated items (e.g., "See also: tires, tubes, saddles, water bottles). That is, indented under the index entry "bicycle" would be the words "See also: tires, tubes, saddles, water bottles". If the user then clicks on an item in this list, corresponding brands and model numbers of the associated list item (e.g., tires) which the vendor has for sale would be displayed on screen. These items (e.g., tires) also appear as individual entries in the index list (in their respective places in alphabetical order) so that a user could directly find them.

The index screen should list synonyms and short names for each item, as some users might be looking not for the name the vendor has chosen (e.g., "bicycle"), but instead for a synonym (e.g., "cycle") or short name (e.g., "bike"), depending on their preference. For example, a user who has always called a "bicycle" a "cycle" may look up the letter "c" in the index looking for "cycle". Another user may look up the letter "b" for "bike" rather than for "bicycle".

On the other hand, in the associated list of related items, there is no need to display such alternative names because when the user is looking at this list he is not alphabetically searching for a word he has preconceived but is instead simply reading the word that the vendor has chosen to include in the associated list and which will surely be recognizable to the searcher.

It would be highly advantageous to be able to accommodate both of these requirements simultaneously.

SUMMARY OF THE INVENTION

According to one aspect, the present invention provides in a computer system, a method of forming a hyperlinked index of computer-readable pages of information, comprising steps of: accessing a table of stored table entries, each table entry having a long-name field for storing a long name of a first item, a short-name field for storing a short name of the first item and a related-items field for storing a name identifying a second item related to the first item; and for each accessed table entry, forming a main portion of an index entry having an anchor tag displaying the text appearing in said long-name field, and forming an associated portion of the index entry having an anchor tag displaying the text appearing in the short-name field of the table entry of the second item referred to in the related-items field.

In a preferred embodiment, each table entry also has a synonym field for storing a synonym of the long name appearing in the long-name field, and the forming steps form an index entry for each synonym field, with the main portion of this index entry having an anchor tag displaying the text appearing in the synonym field of the table entry.

Thus, the textual content of the anchor tag of a hypertext link in an index page changes according to the context in which the hypertext link exists in such a way that the amount of anchor tag text is reduced when the anchor tag appears in an associated list in the index, and the amount of anchor tag text is expanded (e.g., to include synonyms) when the anchor tag appears as an independent index entry. This greatly reduces the amount of screen space used (thus reducing the amount of screen scrolling required), whilst still allowing alternative versions of text to be used for the independent index entries.

According to a second aspect, the present invention provides an apparatus for carrying out the steps of the method of the first aspect.

According to a third aspect, the invention provides a computer program product stored on a computer-readable storage medium for, when run on a computer, instructing the computer to perform the method of the first aspect.

BRIEF DESCRIPTION OF THE DRAWINGS

The invention will be better understood by reference to the below described preferred embodiment, in the description of which, the following drawings will be referred to.

DETAILED DESCRIPTION OF THE PREFERRED EMBODIMENTS

In this preferred embodiment, the Web page used as an example will be a sporting goods vendor named "Bob's Sporting Goods". An index Web page is provided (FIG. 1) with each item in the index being a hypertext link to a separate Web page giving brands and model numbers of the corresponding index item. For example, the hypertext link having the anchor tag "bicycle" 11 in FIG. 1 can be clicked on by the user to display a separate Web page listing various brands and model numbers of bicycles which Bob's Sporting Goods offers for sale.

As the word "cycle" is a common synonym of the word "bicycle", the word "cycle" is also provided in the index list as a separate entry 12. For entry 12, although the text of the anchor tag is different from that of entry 11, both anchor tags point to the same URL of the Web page listing the brands and model numbers of bicycles which Bob's Sporting Goods offers for sale. This way, a user who is thinking of the word "bicycle" will be able to find the hyperlink in the index and a user who is thinking of the word "cycle" will also be able to find the same hyperlink in the index.

Figures 1, 2:
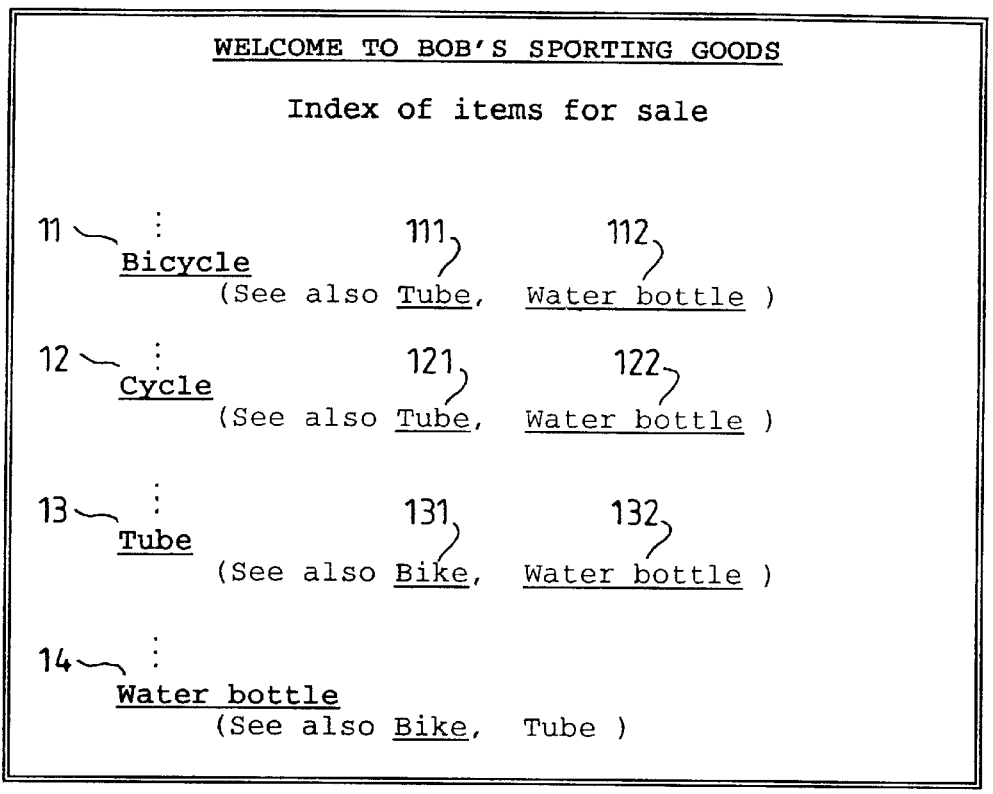
FIG. 1 shows the format of an index page according to a preferred embodiment of the present invention.
FIG. 2 shows an entry of a table used to generate the index page of FIG. 1 according to a preferred embodiment of the present invention.

Index entry 11 also contains an associated list of items (each with its own hypertext link) related to a bicycle (e.g., "tube", "water bottle"). When the user clicks on one of the links, he goes to a separate Web page giving brands and model numbers of the respective item. In FIG. 1, indented underneath the "bicycle" index entry 11 is an associated list (111, 112) of hyperlinks to "tube" and "water bottle" Web pages. This helps a user who has found the word "bicycle" in the index list and would then like to quickly find details of other items that are related to "bicycles" without having to independently find these other items in the index list.

Of course, if the user is specifically looking for one of these related words ("tube" or "water bottle") he can look directly in the index for them and find them as entries 13 and 14 respectively.

Also, indented under "tube" entry 13 is a list of associated items "bike" 131 and "water bottle" 132. When the user clicks on anchor tag 131, the same list of bicycle brands and model numbers that would be displayed if the user clicked on anchor tags 11 or 12 is displayed. This is because the anchor tag 131 is linked to the same URL as the anchor tags 11 and 12. In this way, screen space is saved, as a short name (e.g., "bike") is used instead of the longer names ("bicycle" or "cycle") in the associated list.

It is important to display a plurality of different ways of expressing the name of an item only in the main entry portion (e.g., 11, 12, 13, 14) of the index (where independent index entries are alphabetically listed). This is not important in the associated lists (the "See Also" lists of FIG. 1). Specifically, when a user is examining the main entry portion of the index list, the user is looking for a particular (preconceived) word. The user will scroll through the index list in an alphabetical order looking for the word that he is after. This is why it is important in independent entries in an index to have alternative names for an item (synonyms, short names, long names etc.). However, the associated lists serve a different purpose. The user is not looking for a preconceived word. Instead, the user need only recognize the word that Bob's Sporting Goods has chosen to identify that item.

Thus, according to the preferred embodiment of the present invention, in the associated lists, the textual content of the anchor tags is selected so as to use a short name for the item (e.g., "bike") if one exists. This greatly saves on screen space which is occupied by the index list of FIG. 1. That is, by using the word "bike" instead of "bicycle", the anchor tag takes up less screen space and thus places more information onto the user's immediate display. The user does not have to issue as many scroll commands to move more text into the field of vision of the display.

A preferred way of generating such an index page will now be described, again using Bob's Sporting Goods as an example.

Each item (e.g., bicycle) that Bob's Sporting Goods is offering for sale is stored as an entry 21 (see FIG. 2) in a table of such entries. FIG. 2 shows the table entry for the bicycle item sold by Bob's. This entry is part of a larger table which includes similar entries for each item sold by Bob's.

The entry 21 includes a field 211 for storing a long version of the anchor tag text that can be used as a name for this item ("bicycle"). Field 212 stores a short name ("bike"). Field 213 stores a first synonym ("cycle"). Field 214 stores the URL of the Web page containing the list of bicycle brands and model numbers which Bob's has for sale. Finally, field 215 stores a list of items which are related to bicycles. These latter items related to bicycles have their own independent entries in the table of which entry 21 is an element.

Figure 3:
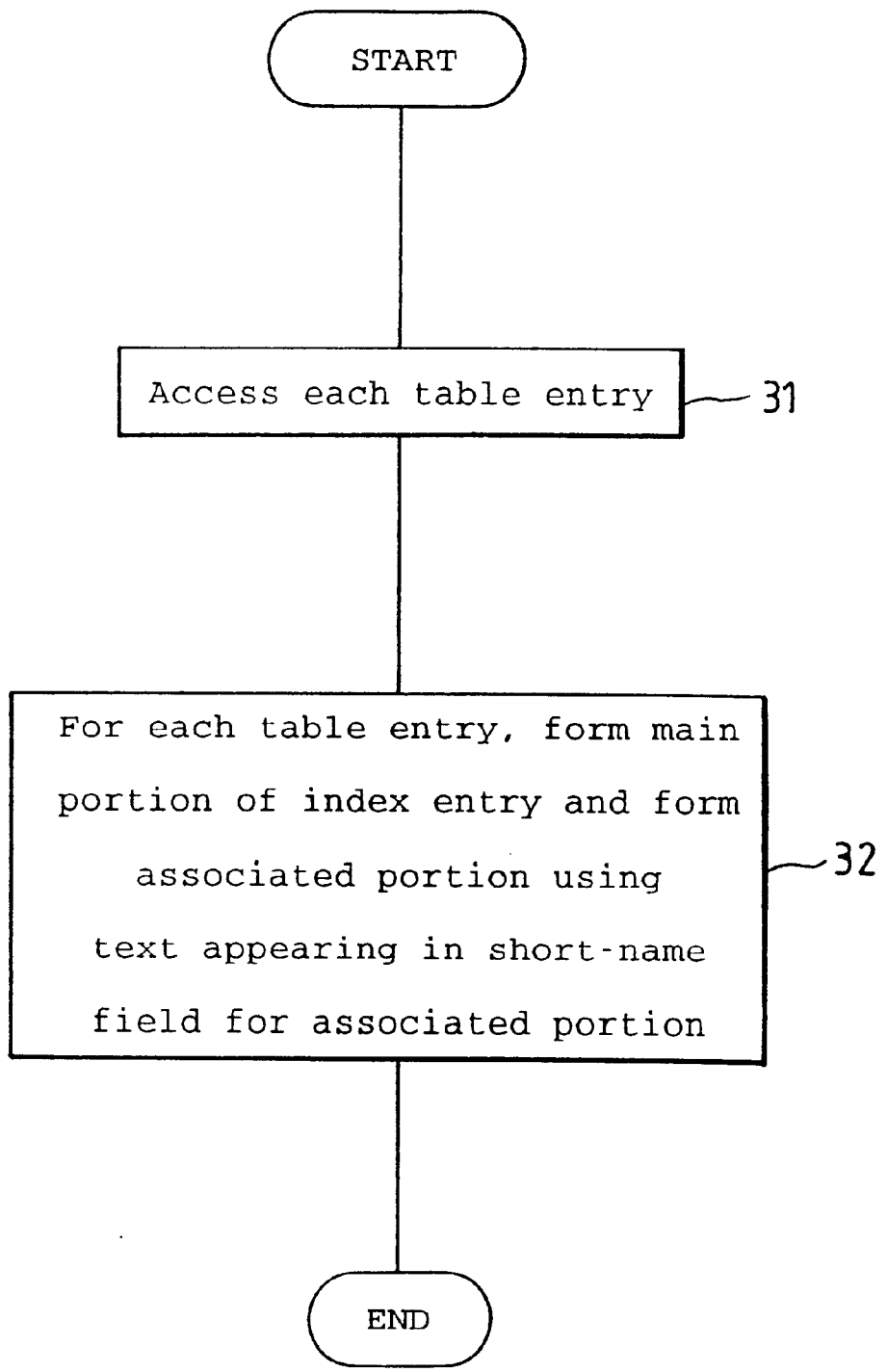
FIG. 3 is a flowchart showing the control which takes place according to a preferred embodiment of the invention.

When the index page (FIG. 1) is being formed, a suitably programmed computer accesses (step 31, FIG. 3) each entry (e.g., 21, FIG. 2) of the table and forms (step 32, FIG. 3) an index entry (e.g., 11, FIG. 1) therefrom. In doing this, each term in the fields 211 and 213 ("bicycle" and "cycle") are added as separate entries (e.g., 11 and 12) of the index, with the URL specified at field 214 being the Web page where the user will be sent when he clicks on the anchor tags 11 or 12.

Then, the related items field 215 is checked and the terms listed therein are formed into an associated list for index entries 11 and 12. That is, for the first term "tube" in field 215, the program would look in the table for the word "tube" existing in one of the fields 211, 212 or 213. When it finds this entry, it goes to the short term field 212 and takes the text therefrom and uses it in forming the associated list entries 111 and 121 for index entries 11 and 12, respectively. If there is no entry in field 212, then the entry in one of the fields 211 or 213 is used. Then, the same processing occurs with respect to the second term "water bottle" in field 215 of entry 21.

In forming the associated list, the URL found in field 214 of the table entry pointed to by the entry in the "related items" field 215 of table entry 21 is used. That is, in forming the hyperlink for entry 111 in the associated list associated with independent index entry 11, the URL found in field 214 of the "tube" table entry (the table entry with "tube" appearing in one of fields 211, 212 or 213) is used.

An important feature of the invention is that in the above steps the name appearing in the short text field 212 is chosen as the text for the anchor tag for the hypertext link for the associated ("See also") list. It is only when there is no entry in field 212 that the name appearing in another field (e.g., 211) is used. For example, in forming index entry 13 ("Tube") the bicycle item would be referred to in field 215 so this would point the processing to entry 21 of the table, where field 212 of entry 21 would be examined. Finding an entry in field 212, the text "bike" would be used in forming the text for the anchor tag of the hyperlink 131.

This greatly increases the amount of text that can be displayed on a screen, thus greatly reducing the amount of scrolling that the user must undergo.

I claim:

1. In a computer system, a method of forming a hyperlinked index of computer-readable pages of information, comprising steps of:

accessing a table of stored table entries, each table entry having a long-name field for storing a long name of a first item, a short-name field for storing a short name of the first item and a related-items field for storing a name identifying a second item related to the first item; and for each accessed table entry, forming a main portion of an index entry having an anchor tag displaying the text appearing in said long-name field, and forming an associated portion of the index entry having an anchor tag displaying the text appearing in the short-name field of the table entry of the second item referred to in the related-items field.

2. The method of claim 1 wherein each table entry also has a synonym field for storing a synonym of the long name appearing in the long-name field.

3. The method of claim 2 wherein said forming steps form an index entry for each synonym field, with the main portion of this index entry having an anchor tag displaying the text appearing in the synonym field of the table entry.

4. In a computer system, an apparatus for forming a hyperlinked index of computer-readable pages of information, comprising:

means for accessing a table of stored table entries, each table entry having a long-name field for storing a long name of a first item, a short-name field for storing a short name of the first item and a related-items field for storing a name identifying a second item related to the first item; and for each accessed table entry, means for forming a main portion of an index entry having an anchor tag displaying the text appearing in said long-name field, and forming an associated portion of the index entry having an anchor tag displaying the text appearing in the short-name field of the table entry of the second item referred to in the related-items field.

5. The apparatus of claim 4 wherein each table entry also has a synonym field for storing a synonym of the long name appearing in the long-name field.

6. The apparatus of claim 5 wherein said forming steps form an index entry for each entry in said synonym field, with the main portion of this index entry having an anchor tag displaying the text appearing in the synonym field of the table entry.

7. A computer program product stored on a computer-readable storage medium for, when run on a computer, instructing the computer to form a hyperlinked index of computer-readable pages of information, said computer program product comprising software code portions for:

accessing a table of stored table entries, each table entry having a long-name field for storing a long name of a first item, a short-name field for storing a short name of the first item and a related-items field for storing a name identifying a second item related to the first item; and for each accessed table entry, forming a main portion of an index entry having an anchor tag displaying the text appearing in said long-name field, and forming an associated portion of the index entry having an anchor tag displaying the text appearing in the short-name field of the table entry of the second item referred to in the related-items field.

8. The computer program product of claim 7 wherein each table entry also has a synonym field for storing a synonym of the long name appearing in the long-name field.

9. The computer program product of claim 8 wherein said forming steps form an index entry for each entry in said synonym field, with the main portion of this index entry having an anchor tag displaying the text appearing in the synonym field of the table entry.

\* \* \* \* \*

UNITED STATES PATENT AND TRADEMARK OFFICE
CERTIFICATE OF CORRECTION

PATENT NO. : 6,735,739 B1
DATED : May 11, 2004
INVENTOR(S) : Martin James Ronan Healey It is certified that error appears in the above-identified patent and that said Letters Patent is hereby corrected as shown below:

Title page,
Item [54], Title, replace as follows:
-- FORMING A HYPERLINKED INDEX HAVING ENTRIES WITH LONG AND SHORT NAMES --

Signed and Sealed this

Eleventh Day of January, 2005

JON W. DUDAS
*Director of the United States Patent and Trademark Office*